(No Model.) 2 Sheets—Sheet 2.

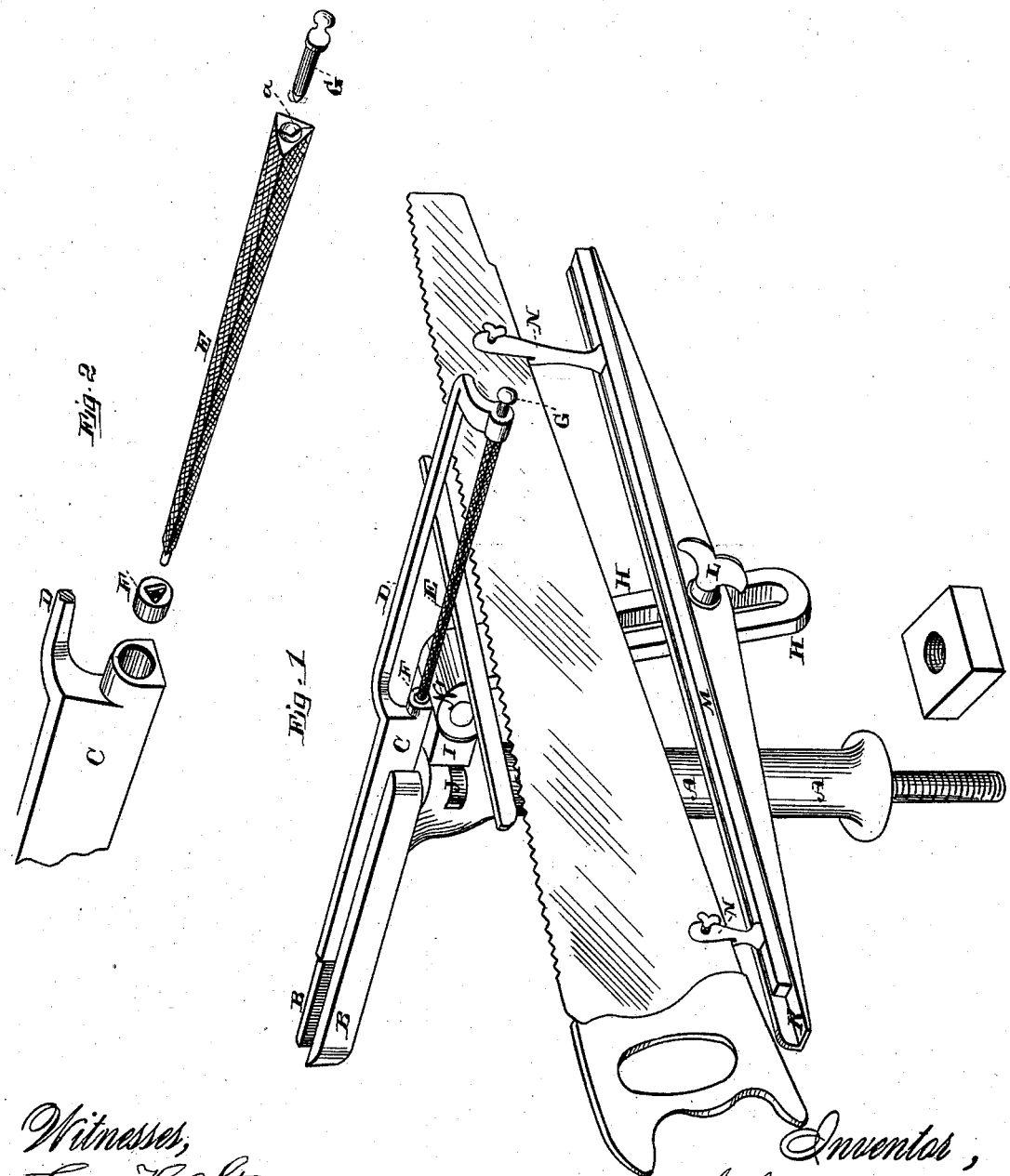

J. PALM.
SAW FILING MACHINE.

No. 267,756. Patented Nov. 21, 1882.

Witnesses:
Walter Fowler,
R. K. Evans

Inventor:
Jno. Palm
by A. H. Evans & Co
Attys

UNITED STATES PATENT OFFICE.

JOHN PALM, OF MONITOR, ASSIGNOR OF ONE-HALF TO JAMES G. McCLINTON, OF SAN FRANCISCO, CALIFORNIA.

SAW-FILING MACHINE.

SPECIFICATION forming part of Letters Patent No. 267,756, dated November 21, 1882.

Application filed February 28, 1882. (No model.)

*To all whom it may concern:*

Be it known that I, JOHN PALM, of Monitor, county of Alpine, State of California, have invented a Saw-Filing Apparatus; and I hereby declare the following to be a full, clear, and exact description thereof.

My invention relates to an apparatus for holding and filing saws; and it consists of a post or stand, which may be fixed to a bench or other support. This post has a slotted arm hinged to it by a joint which allows of a horizontal or a vertical movement. A transverse bar is fixed at any desired point in this slotted arm, and the saw-holder rests and is adjusted upon this bar so as to bring the teeth of the saw at the proper height and angle for the action of the file, which is fixed in a guide so as to move across the teeth at any desired angle. The file is peculiarly constructed and supported in its guide, so that it may be turned upon its own axis, as will be more fully explained by reference to the accompanying drawings, in which—

Figure 3:
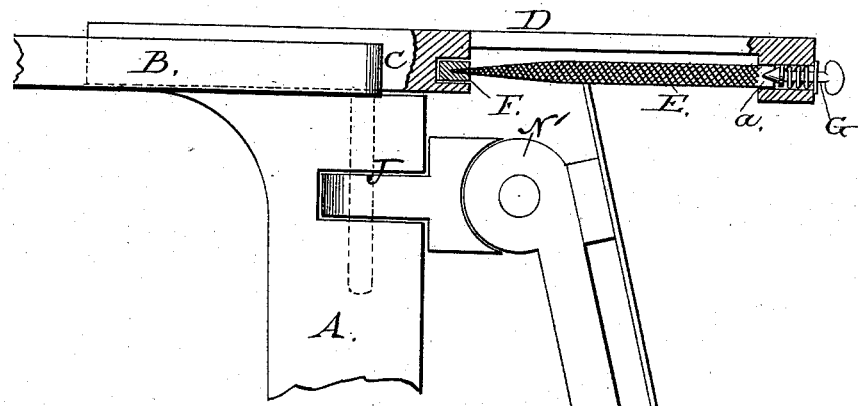
Figure 4:
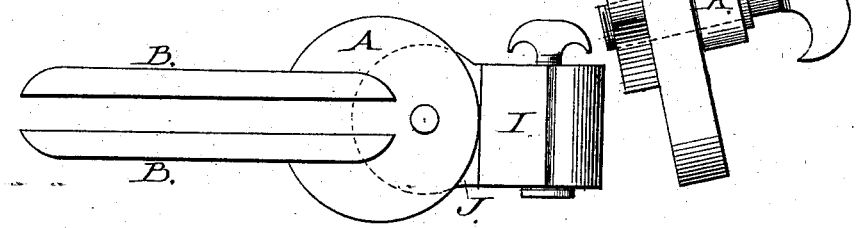
Figure 5:
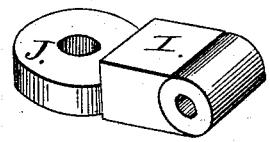
Figure 6:

Figure 1 is a view of my apparatus. Fig. 2 is a detail of construction. Fig. 3 is a side elevation of the saw-holder and file-clamps. Fig. 4 is a plan view of the saw-holder with file-clamps removed. Fig. 5 is a view of the swiveling connection which supports the saw-holder. Fig. 6 is an enlarged view of the file-clamping pin and end of the file in section.

A is a supporting-post, having a screw at the bottom with a nut, so that it may be firmly fixed to a bench. From the top of this post guides B extend horizontally, and a slide, C, is fitted to move between them. A curved arm, D, extends back from this slide, and has a socket to receive the end of the file E. The file is made without any tang or extended point. The smaller end fits into a triangular hole in a short cylinder, F, which turns in the end of the slide C. The opposite end of the file, which is cut square off, has a hole and transverse slot, *a*, made across said hole, and a corresponding projection or flange, *f*, at the end of the thumb piece or screw G, enters it and serves to turn the file to any desired angle to suit the saw to be filed. Beneath the file-guide is a depending slotted arm, H, which is hinged to a block, I, so as to have a vertical movement about its hinge. The block is pivoted within the post A at J, so as to have a horizontal motion through the medium of a hinge, N', and by these two movements the arm H may be adjusted to any position or angle with relation to the file. A transverse bar, K, lies across the arm H, and a screw passes through the slot and the bar, a thumb-nut, L, upon the outside, serving to secure it at any point up or down the slot. A bar, M, is fitted to and rests upon the bar K, so that it may slide from right to left, and it has two posts, N, into which the saw is slipped and held by screws or otherwise. The bar K may be turned to any angle and raised to a point which will bring the line of the teeth in the proper position for the file to act upon them, and the whole saw-support may be turned to an angle to the file by turning it upon the joint J.

By this construction I am enabled to place a saw of any shaped teeth at such an angle that the file E, directed by its guide, will cut every tooth at exactly the same angle. The peculiar construction and support of the file itself allows it any adjustment to facilitate this work.

The tension of the pin through hinge N' may be made to sustain H at any desired angle, or a thumb-screw may be supplied to hold it in place.

Having thus described my invention, what I claim as new, and desire to secure by Letters Patent, is—

1. In a saw-filing apparatus, the fixed post A, having the block I secured to it so as to be adjusted in a horizontal plane, and the slotted arm H, hinged to the block and adjustable in a vertical plane, in combination with the transverse bar K, adjustable upon the slotted arm, and the saw-support M, with its posts N N, substantially as herein described.

2. In a saw-filing apparatus, the fixed post A, the hinged adjustable arm H, bar K, and saw-support M, in combination with the guides B, slide C, and file-supporting frame D, substantially as for the purpose herein described.

3. The file-slide C, with its arm D, in combination with the cylinder F, with its triangular socket, and the screw G or an equivalent device to hold the opposite end of the file and adjust it to any angle in its frame, substantially as herein described.

4. The file E, having its smaller end fitted into the cylindrical holder F, and its large end cut square and perforated or slotted to receive the end of the holding and adjusting device, substantially as herein described.

In witness hereof I hereby set my hand.

JOHN PALM.

Witnesses:
  GEO. H. STRONG,
  G. W. EMERSON.